March 24, 1970     E. S. DAHL ET AL     3,501,902
SIDE GUARD FOR LAWN MOWER
Filed Jan. 13, 1967
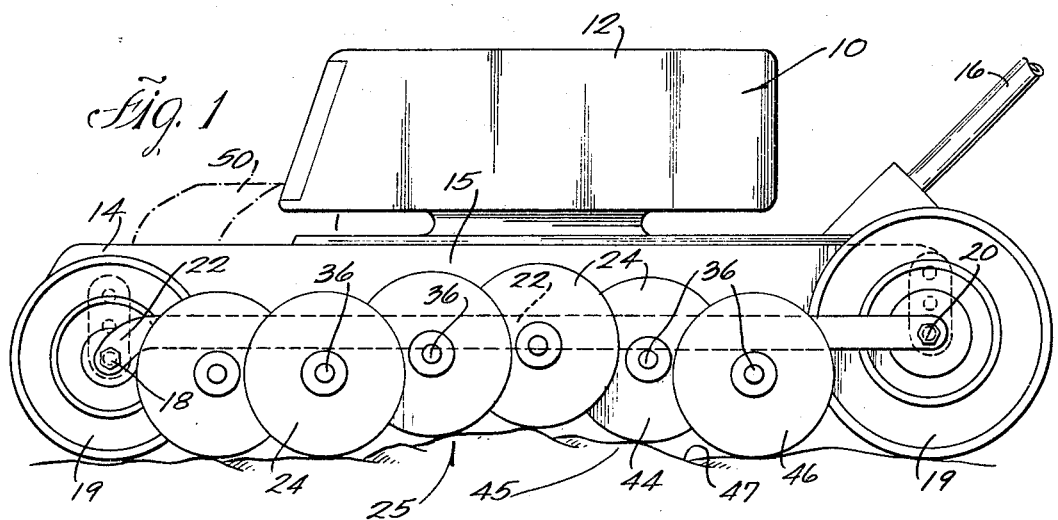
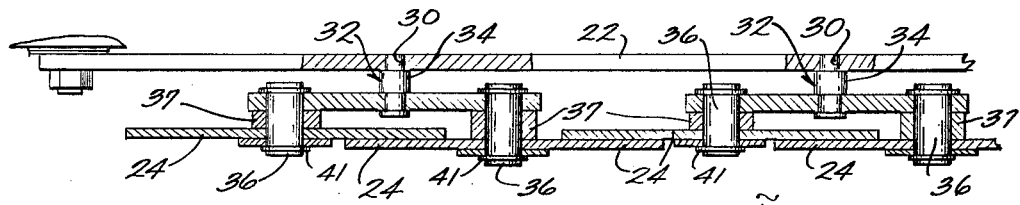
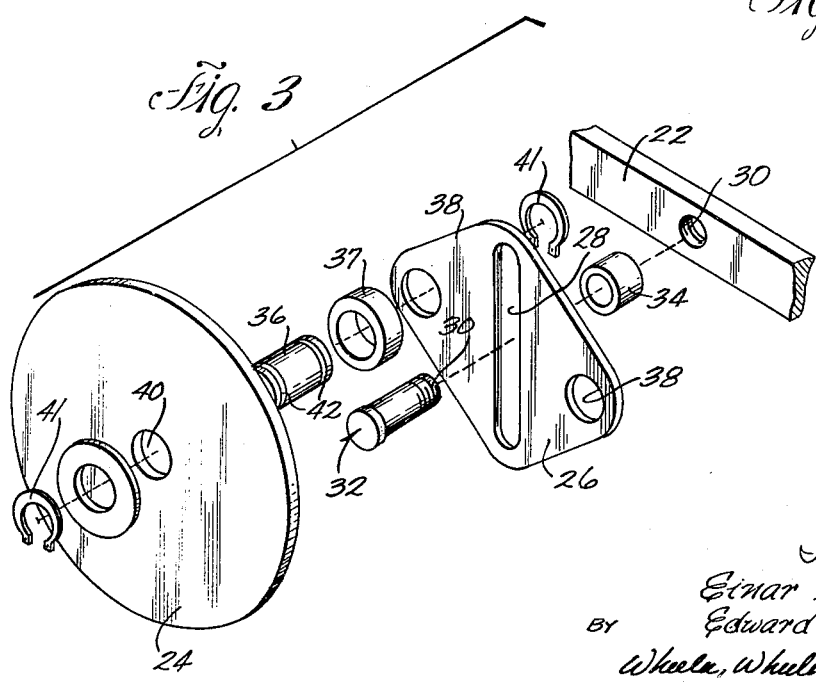
Inventors
Einar S. Dahl
Edward W. Putter
BY
Wheeler, Wheeler, House & Clemency
Attorneys

# United States Patent Office 3,501,902
Patented Mar. 24, 1970

3,501,902
SIDE GUARD FOR LAWN MOWER
Einar S. Dahl and Edward W. Puffer, Galesburg, Ill., assignors to Outboard Marine Corporation, Waukegan, Ill., a corporation of Delaware
Filed Jan. 13, 1967, Ser. No. 609,137
Int. Cl. A01d 75/20
U.S. Cl. 56—25.4                                         6 Claims

ABSTRACT OF THE DISCLOSURE

Disclosed herein are safety side guards for a rotary mower consisting of a longitudinal array of thin ground engaging annular disks carried by side rails connected to the front and rear axles of the mower. The disks are rotatably mounted in pairs on plates to minimize drag, and overlap to provide a continuous shield along the side of the mower. Vertical and rocking movement of the plates and disks in response to ground relief features, or elevation changes, is afforded by an elongated vertical slot in the plates and studs extending through the slots and secured to the side rails.

BACKGROUND OF THE INVENTION

In the use of rotary mowers, the high speed cutting blade occasionally strikes a stone or pebble and impels the pebble from beneath the mower housing at high velocity endangering the operator and bystanders. Conventional rotary mowers have the cutting blade enclosed in a housing so that the blade track or plane of the cutting blade is slightly above the lower edge of the housing. The clearance between the ground level and the lower edge of the housing varies between one of three inches depending on the setting to vary the height of cut. Normally the adjustment for height of cut is provided by raising the housing and the blade as a unit. When the blade housing is raised to increase the height of cut, the protection afforded by the housing decreases and accordingly the hazard to the operator or persons near by of impelled objects such as stones or pebbles is increased.

SUMMARY OF THE INVENTION

In accordance with the present invention additional protection to the operator and bystanders is afforded by safety side guards which maintain constant clearance above the ground independently of the adjustment of the height of the blade housing to vary the height of cut.

It is also an object of the present invention to provide safety side guards with a minimum drag on the mower caused by engagement of the side guards with the grass or ground.

The safety side guards of the present invention comprise a longitudinal array of relatively thin and overlapping disks rotatably mounted at the sides of the housing to form a continuous shield protecting the operator or bystanders from ejection of missiles from beneath the sides of the mower housing. The disks can be mounted so that they engage the ground, or so that they travel a short distance above the ground. The mounting arrangement also affords vertical movement of the disks within a predetermined range, thereby permitting the disks to raise and lower in conformity with the relief of the ground. In the preferred embodiment, pairs of disks are rotatably mounted on plates which have a vertically elongated slot and which are spaced along each side rail and mounted thereto by studs extending through the slots, thereby affording, in addition to the rotating movement of the disks, both vertical and rocking movement of the assemblies of the plates and disks in response to ground engagement. Such mounting provides maximum continuity of shielding along the sides of the mower with minimum resistance or drag.

Further objects and advantages of the present invention will become apparent from the following drawings and accompanying description.

DRAWINGS

FIGURE 1 is a side elevational view of a rotary mower embodying various of the features of the invention.

FIGURE 2 is an enlarged fragmentary plan view in partial section of the safety side guard shown in FIGURE 1.

FIGURE 3 is an enlarged exploded view of the disk assembly.

DETAILED DESCRIPTION

Referring now to the drawings, there is illustrated a rotary mower which is designated generally 10, and which has an engine 12 mounted on a housing 14 with a depending peripheral skirt 15. The housing is supported by front and rear axles 18 and 20 carrying wheels 19. In accordance with the invention, safety side guards are provided which comprise respective rails 22 which are located on opposite sides of the mower 10 and which are secured at each end to the axles 18 and 20 and which carry a longitudinal or fore and aft array of relatively thin overlapped annular disks 24. The disks 24 engage the ground 25 as shown in FIGURE 1 for increased protection. However, an alternate construction could carry the disks a short distance above the ground level.

The disks 24 are mounted to the rails by means comprising a series of floating rocker plates 26 each having a generally vertical elongated slot 28. The plates 26 are mounted along the rails 22 by studs 32 extending through the slots 28 and threaded into apertures 30 in the rails 22 and separated from the rails by annular spacers 34. The apertures 30 and studs 32 are spaced along the rails to afford partial overlapping of the disks 24 as illustrated in FIGURES 1 and 2 to obtain continuous shielding. Each plate 26 carries two disks 24 which are rotatably mounted to the plates 26 by studs or shafts 36 which extend through an axial aperture 40 in each disk 24 and which carry spacers 37. The spacers 37 for each pair of disks have different axial lengths as illustrated in FIGURE 2 to space the disks 24 in overlapping relation. In the disclosed construction, the disks 24 and shafts 36 are secured to the plates 26 by the lock rings 41 which engage annular grooves 42.

The mounting arrangement of the disks in accordance with the invention affords generally vertical movement of the disks 24 in response to terrain relief or ground features. Stud 32 also serves as a fulcrum for pivotal movement or anguar displacement of the plate 26 when, for example, the forward disk 44 moves upward in responce to a rise 45 in the ground and the rearward disk 46 on the same plate 26 enters a depression 47.

In operation of a rotary mower embodying the present invention, the disks 24 minimize the hazard to the operator of persons nearby of high speed missiles being ejected beneath the sides of the mower housing. The disks 24 afford continuity of protective shielding although the mounting of the disks affords negligible drag on the mower caused by engagement of the disks with the ground.

The housing 14 is provided with a top discharge port which can be adapted for use with a discharge chute 50 in accordance with disclosure in U.S. Patent No. 3,118,267.

Various of the features of the present invention are set forth in the following claims.

What is claimed is:

1. A rotary mower including spaced apart front and rear axles, wheels on said axles for supporting said mower, a side rail secured to said front and rear axles, a plurality of disks, means for mounting said disks in an array along said rail, said means for mounting said disks affording rotatable movement of each of said disks and vertical movement of the axes of said disks relative to said side rail in response to engagement of said disks with the ground or grass.

2. A rotary mower in accordance with claim 1 wherein said disks overlap.

3. A rotary mower including spaced apart front and rear axles, wheels on said axles for supporting said mower, a side rail secured to said front and rear axles, a plurality of disks, a series of plates, each plate having rotatably mounted thereon one of said disks and having an elongated vertical slot, and studs extending through said slots and into said side rail to afford vertical movement of said plates relative to said side rail and circumferential movement of said plates about said studs.

4. A rotary mower in accordance with claim 3 wherein each of said plates has two of said disks rotatably mounted thereon in overlapping relation.

5. A rotary mower including spaced apart front and rear axles, wheels on said axles to support said mower for travel in adjacent relation to the ground, a side rail secured to said front and rear axles, a plurality of disks, means for mounting said disks in an array along said rail, said means for mounting said disks affording rotatable and vertical movement of said disks in response to engagement with the ground or grass, and with the lower edge of said disks above a line tangent to the lower edge of said wheels carried by said front and rear axles.

6. A rotary mower including a blade housing with a depending peripheral skirt, spaced apart front and rear axles supporting said housing, wheels on said axles, a pair of side rails secured to said front and rear axles, a series of plates, each plate having rotatably mounted thereon two disks and having an elongated vertical slot, studs extending through said slots in said plates and into said side rails to afford vertical movement of said plates relative to said side rails and circumferential movement of said plates about said studs.

References Cited

UNITED STATES PATENTS

| | | | |
|---|---|---|---|
| 554,153 | 2/1896 | Spain et al. | 172—510 X |
| 1,443,478 | 1/1923 | Kouach | 152—85 |
| 1,630,415 | 5/1927 | Blume et al. | 172—510 |
| 2,806,339 | 9/1957 | Whitney | 56—25.4 |
| 2,929,186 | 3/1960 | Bundy | 56—25.4 |
| 3,264,807 | 8/1966 | Wallace | 56—25.4 |

ANTONIO F. GUIDA, Primary Examiner

P. A. RAZZANO, Assistant Examiner

U.S. Cl. X.R.

172—510